April 1, 1952     W. H. BRANDT ET AL     2,590,927

ELECTROLYTIC METHOD OF REMOVING BURRS

Filed July 17, 1948

WITNESSES:
Robert C. Baird

INVENTORS
Weldon H. Brandt, Morgan W. Rider,
and Raymond C. Westphal.
BY
Frederick Shape
ATTORNEY Patented Apr. 1, 1952

2,590,927

UNITED STATES PATENT OFFICE 2,590,927

ELECTROLYTIC METHOD OF REMOVING BURRS

Weldon H. Brandt, Wilkinsburg, Pa., Morgan W. Rider, Morgantown, W. Va., and Raymond C. Westphal, Pittsburgh, Pa., assignors to Westinghouse Electric Corporation, East Pittsburgh, Pa., a corporation of Pennsylvania Application July 17, 1948, Serial No. 39,296

4 Claims. (Cl. 204—56)

This invention relates to the treatment of metal to remove burrs and fine slivers therefrom by electro-chemical means.

This application is a continuation-in-part of our copending patent application Serial No. 531,870, filed April 20, 1944 (now abandoned).

In the machining of metal members the machining operation generally leaves burrs, slivers or other projections usually at the corners and edges. Burrs and slivers are undesirable for many reasons. To remove the burrs and slivers and the like, buffing, tumbling, shot blasting, sanding, filing and similar mechanical operations are customarily resorted to. The cost of burr removal is excessive in many instances since a large amount of hand labor may be required.

In electrical apparatus, it is frequently necessary to employ therein a magnetic core composed of a plurality of laminations of magnetic metal. The efficiency of the magnetic core when subjected to alternating flux is dependent upon the insulation of each lamination from the other laminations so that short circuits are not present between the laminations. The reason for this is that under the influence of a magnetic field, each lamination generates a small electrical potential which, if short circuited, causes a large loss of electrical energy in the form of heat as compared to the losses when the laminations are effectively separated from one another.

Laminations are short circuited by the burrs, slivers and metal projections produced during machining and by the punching or cutting of the metal sheets into the laminations. The burrs or slivers are present almost entirely at the cut edges of the metal laminations. When a plurality of the cut edges are stacked in alignment, the burrs or slivers from one lamination will come into electrical contact with the succeeding lamination whereby an undesirable short circuit condition is produced. It has been proposed heretofore to grind or otherwise machine the cut edges of a stack of laminations in order to eliminate the burrs produced during the stamping or cutting operations of the several laminations. Tests, however, show that grinding itself introduces burrs and often will not greatly reduce the electrical losses of the magnetic core as compared to its original condition.

The object of this invention is to provide for efficiently removing burrs and slivers from machined members.

A further object of the invention is to provide for removing burrs and slivers from metal members by electrochemical means without causing undesirable corrosion of the metal members.

A still further object of the invention is to provide for removing burrs, slivers and the like from metal by means of phosphoric acid solutions, the phosphoric acid being rendered active by an electrical current.

Other objects of the invention will in part be obvious and will in part appear hereinafter.

For a fuller understanding of the nature and objects of this invention reference should be had to the following detailed description and drawing, in which.

Figure 3:
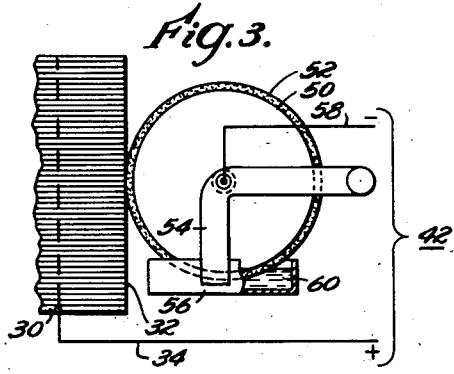
Figure 4:
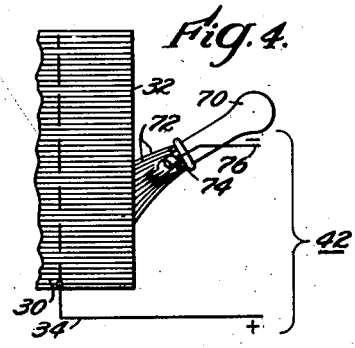
Figure 5:
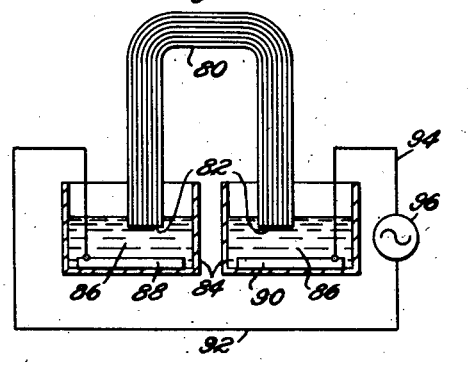
Figure 6:
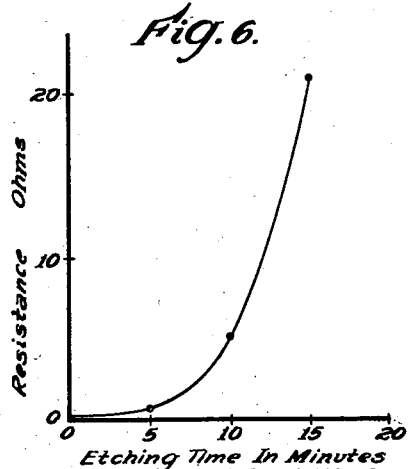

Fig. 3 is a fragmentary view in elevation of a further embodiment of the invention, Fig. 4 is a fragmentary view in elevation of another embodiment of the invention, Fig. 5 is a view in elevation partly sectioned of an embodiment of the invention applied to U-shaped cores, and Fig. 6 is a graph of the resistance in ohms plotted against etching time in minutes for a given magnetic core treated according to the invention.

According to the present invention, burrs and slivers in cores and other metal members are removed by means of phosphoric acid in conjunction with an electrical current to render the phosphoric acid active for the intended purpose. Phosphoric acid is unsuitable for this purpose in the absence of electrical current. Ferrous metal in particular, when subjected to phosphoric acid, forms an insoluble iron phosphate coating on the metal surface which then inhibits further action of the phosphoric acid. Burrs and slivers of any appreciable size are not attacked or etched off by phosphoric acid alone. However, when employed in combination with an electrical current, the phosphoric acid becomes extremely active whereby even heavy burrs and slivers may be removed in a few minutes' time.

The process of this invention is particularly effective in removing burrs, projections, slivers and the like from cast iron, steel, silicon iron having up to 6% silicon, such as is used in making magnetic members, alloy steels and other ferrous metals. Copper and copper alloys such as brasses and bronzes of all kinds may be treated with good results.

A particular advantage arising from the use of phosphoric acid on ferrous metal, such for example as magnetic cores, is the property of the phosphoric acid of forming a protective iron phosphate film on the iron surfaces when the flow of electrical current is discontinued. The iron phosphate coatings constitute a protective electrically insulating film on the laminations, which also prevents rusting. Other mineral acids, if applied to the core, would not form this protective film. In fact, mineral acids, such as hydrochloric acid, will accelerate corrosion if left in the core. Heretofore a problem of major concern in etched metal was to prevent the accelerated corrosion of the treated metal. Therefore, the phosphoric acid accomplishes two desirable functions if used as described herein. It not only satisfactorily removes the burrs and slivers when applied in combination with an electrical current but produces a corrosion resisting and electrically insulating coating between the laminations. Ferrous magnetic laminations treated according to the invention have been subjected to various atmospheric conditions for periods of more than a year without showing any corrosion.

For the practice of this invention, aqueous solutions of phosphoric acid comprising from about 1% to 35% by volume (corresponding to from 1.5% to 56%, by weight) of anhydrous phosphoric acid have given good results. A solution comprising 10% by volume of orthophosphoric acid has proven to be quite satisfactory from a manufacturing standpoint. More concentrated solutions than 35% by volume of orthophosphoric acid have not given satisfactory results.

By phosphoric acid it is intended to refer to orthophosphoric acid. However, phosphorous pentoxide or other phosphoric acids which when placed in water or under the influence of an electrical current will form orthophosphoric acid, will be satisfactory for the practice of the invention and are intended to be included as equivalents.

In order to secure good wetting of the metal surface, it has been found that a surface tension reducing or wetting agent is a desirable, though not necessary, addition to the electrolyte for the best operation of the process. Suitable agents of this type are ethyl alcohol, methyl alcohol and other simple aliphatic alcohols present in amounts of from 5% to 40% of the volume of the solution. Commercially available wetting agents which may be employed in order to increase the wetting of members when applied to water, such, for example, as sodium alkyl naphthalene sulphonate, sulphonated esters of dicarboxylic acids, long chain alcohol sulphates and sulphonated aromatic alcohols may be included in the aqueous phosphoric acid solution in order to promote wetting of the metal surfaces with a consequent increase in the rate of reaction.

A solution found to be quite satisfactory for the practice of the invention was composed by volume as follows:

10% orthophosphoric acid (anhydrous)
20% alcohol (ethanol)
70% distilled water

Various concentrations of orthophosphoric acid in aqueous solution are commercially available. Compositions having from 1% to 35% by volume of phosphoric acid (anhydrous) may be prepared by adding water to a more concentrated phosphoric acid solution, or a phosphoric solution of the desired concentration may be purchased. Thus a 30% by volume phosphoric acid solution may be purchased as such or it may be prepared by diluting 100 volumes of 85% (by weight) phosphoric acid solution with 153.8 volumes of water. In a similar manner, alcohol may be added as absolute alcohol or if the more common and less expensive aqueous solution of alcohol is used, the volumetric proportions of water and absolute alcohol contributed is taken into account. To prepare the 10% phosphoric acid, 20% ethanol and 70% water solution above given in which all proportions are by volume, it is only necessary to admix 13 volumes of 85% (by weight) phosphoric acid, 21 volumes of 95% ethanol and 66 volumes of water.

The metal member to be deburred is connected with a source of either alternating current or direct current, the metal being treated being the anode in the latter case. Various inert materials, such, for example, as lead or graphite, may be used as the other electrode or, if desired, an iron plate may be employed for this purpose.

Under the influence of the electrical current, burrs and slivers are etched off rapidly and effectively from metal surfaces when subjected to the phosphoric acid solution. A current density of from 0.1 ampere to 1.0 ampere per square centimeter has given the optimum results in operation. The etching operation is completed in less than 15 minutes even when treating severe burr conditions.

In magnetic cores, the removal of the burrs and slivers is indicated by an increase in interlaminar resistance as well as a decrease in alternating current losses. If the assembled laminations forming the core have been ground to produce a plane face, the electroetching operation may cause a slight increase in the air gap. This slight increase in the gap does not appreciably affect the efficiency of the magnetic core assembly.

Figure 1:
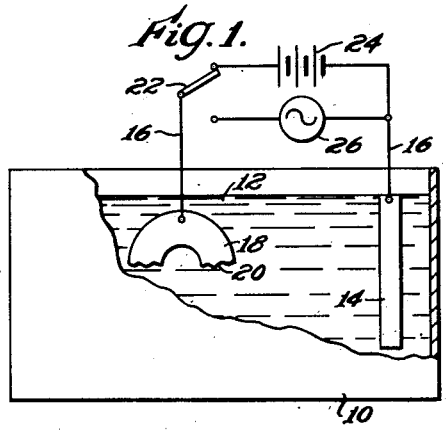
Figure 1 is a view in elevation partly broken away of an apparatus for carrying out the invention.

Referring to Fig. 1 of the drawing, there is illustrated a typical setup for deburring members in accordance with this invention. A tank 10 contains the phosphoric acid electrolyte solution 12 in which is provided a suitable electrode 14. A member 18, having burrs on face 20 which burrs are to be removed, is disposed in the electrolyte 12 by the conductor 16 which may be connected by a switch 22 to a source 24 of direct current that will make the member 18 anodic, or to a source of alternating current 26. The member 18 need be subjected to the action of the electrolyte 12 using either alternating or direct current, exclusively, or consecutively, for a few minutes to reduce the burrs and to produce a substantially flat surface. It will be found that the deburring treatment will produce a smooth surface on the faces 20 of the member which, as shown in Fig. 1, originally carried heavy burrs or projections such as may be produced by maching operations of various kinds.

Small pieces to be deburred may be placed in a rack or disposed on a hanger for immersion in the solution 12. In some cases a plating barrel may be filled with pieces to be deburred and treated with phosphoric acid solution and electrical current as described.

Figure 2:
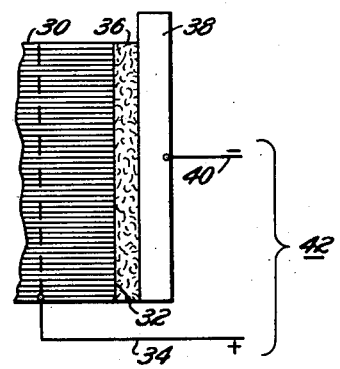
Fig. 2 is a fragmentary showing of a modified form of the invention.

The member to be deburred may be of such size or so disposed that it may be difficult to employ the apparatus shown in Fig. 1. For instance, large motor stators or rotors may be so large as to render it impractical to place them in a tank for treatment with the phosphoric acid electrolyte. In that case, the apparatus and procedure of Fig. 2 may be employed to remove the burrs. The core 30 may be covered with a thick absorbent pad 36 carrying the phospheric acid solution. The pad 36 may be composed of blotting paper, rubber sponge material or any other suitable porous absorbent substance. The pad 36 is applied into close contact with the surface 32 of the member 30 to be deburred. Thereafter a suitable electrode 38, which may conveniently be a deformable lead plate, may be applied over the absorbent layer 36. A source of direct electrical current 42 may be connected to the electrode 38 by means of a conductor 34 attached to the anode and the conductor 40 to the cathode of the source of current. The reaction is allowed to proceed until the burrs and slivers have been etched away. If the quantity of phosphoric acid solution present in the absorbent pad 36 is depleted by reaction, it may be replenished from time to time by dipping the pad 36 in the acid solution or occasionally sprinkling the phosphoric acid solution thereon.

After one portion of the core face of the apparatus has been freed of burrs, the pad 36 and electrode 38 may be moved and applied to a second portion. Thus in a number of steps the entire core of a large electrical machine may be completely treated. The process may be carried out with relatively little equipment and at a low cost. It is not necessary to rinse the metal completely since a small quantity of phosphoric acid does no harm and will be beneficial by forming a corrosion resisting, insulating phosphate coating on the metal.

For treating metal surfaces, such, for example, as either a large magnetic core, large alternator stators, or a plurality of aligned smaller cores, the apparatus of Fig. 3 may be found to be convenient. The machined face 32 characterized by a large quantity of burrs and slivers thereon is subjected to rolling contact with a cathodic drum 50 carrying a phosphoric acid saturated pad 52. The drum is supported by the arm 54 which may be manually carried or otherwise suspended on either a suitable stationary bracket or a crane. The lower end of arm 54 carries a pan 56 in which a supply of phosphoric acid solution 60 is maintained for replenishing the pad 52 as the phosphoric acid is used up during the treatment. A conductor 58 and a conductor 34 connect the drum 50 and the core 30, respectively, to a source of direct current 42.

In order to treat small cores or to remove fine burrs, the portable brush setup shown in Fig. 4 may be suitable. The face 32 of a core 30 is brushed slowly with bristles 72 of the brush 70. The bristles 72 are dipped periodically in a solution of phosphoric acid. An electrode 74 disposed within the bristles 72 provides for current passing from the core face 32 through the phosphoric acid electrolyte. A conductor 76 and a conductor 34 connect the brush and the core to the cathode and the anode, respectively, of a direct electric current source 42. Brushing is continued for a period of time sufficient to remove the burrs which may be present on the core face 32.

An arrangement for treating U-shaped magnetic cores is shown in Fig. 5. A U-shaped core 80 comprising a plurality of laminations which may be bonded to one another by a suitable adhesive medium may be produced in several ways all usually involving cutting or machining the core to produce plane faces 82. The faces 82 of the core 80 are somewhat rough and are characterized by a great number of short-circuiting burrs and slivers. The core faces 82 are immersed into phosphoric acid electrolyte 86 in two separated receptacles 84. At the bottom of each receptacle 84 is disposed a plate 88 and 90 for instance, of iron, each of which forms an electrode and is connected by the conductors 92 and 94 to a source of alternating electrical current 96. Current will flow from the source 96 through conductor 92 to the plate 88, thence through the phosphoric solution to one face 82, in which process burrs are etched off the face, then current flows through the core 80 to the other face 82 and to the plate 90 through the phosphoric solution 86 which also acts to etch the last face 82, then the current flows through the conductor 94 to return to the source 96. It will be found that alternating current will remove the burrs equally from both faces 82 of the core 80.

Fig. 6 shows the effect of etching time on the resistance between the laminations of a core such as 80 shown in Fig. 5. When produced by a given machining operation the interlaminar resistance of the core was practically zero ohms. When treated in the apparatus shown in Fig. 5, using the 10% phosphoric acid solution previously given the interlaminar resistance rose rapidly and after about ten minutes had reached the value of approximately five ohms. In fifteen minutes, the resistance was more than 20 ohms. This indicates that the short circuiting burrs were substantially completely removed in this time insofar as a sufficiently high interlamination resistance is attained.

The phosphoric acid is the active agent in the composition which enables burrs and silvers of metal to be etched away on passage of electric current. We have found that chromic acid may be added to replace a portion or all of the phosphoric acid on an equal weight basis. Any chromic acid left on the metal after the etching operation will produce a protective chromate film on the metal as does the phosphoric acid.

It is intended that the several modifications of the process and apparatus shown and described be considered exemplary and not limiting.

We claim as our invention:

1. The method of treating a core part for an electrical induction apparatus that comprises an assembled plurality of laminations of magnetizable material having electrical insulating material interposed therebetween and having a pair of faces at which burrs are formed on edges of said magnetizable material exposed at said faces by the production of said faces, the method comprising introducing said pair of faces of said core part in separate bodies of electrically conductive liquid one of which is an aqueous electrolyte capable of deburring metal anodically treated therein, and passing an electric current from one body of liquid to the other through said faces of the core part to electrolytically remove the burrs from the core part face disposed in the body of said electrolyte.

2. The method of treating a U-shaped core part for an electrical induction apparatus that comprises an assembled plurality of laminations of magnetizable material having electrical insulating material interposed therebetween and having a pair of faces at which burrs are formed on edges of said magnetizable material exposed at said faces by the production of said faces, the method comprising introducing said pair of faces of said core part in separate bodies of electrically conductive liquid one of which is an aqueous electrolyte capable of deburring metal anodically treated therein, and passing an electric current from one body of liquid to the other through said faces of the core part to electrolytically remove the burrs from the core part face disposed in the body of said electrolyte.

3. The method of treating the assembled ferrous metal laminations of an electrical device having a pair of exposed surfaces produced by machining leaving fine particles of metal adjacent the exposed surfaces short circuiting the laminations which comprises introducing said pair of exposed surfaces of the assembled laminations into separate bodies of an aqueous solution composed of from 1.5% to 56% by weight of a mineral acid electrolyte capable of forming protective coatings, the mineral acid being selected from the group consisting of phosphoric acid and chromic acid and passing an electrical current through the laminations from one body of the solution to the other body to cause the fine particles of metal to be removed by electrolytic action on said surfaces.

4. The method of treating the assembled ferrous metal laminations of an electrical device having a pair of exposed surfaces produced by machining leaving fine particles of metal adjacent the exposed surfaces short circuiting the laminations which comprises introducing said pair of exposed surfaces of the assembled laminations into separate bodies of an aqueous solution composed of from 1.5% to 56% by weight of a mineral acid electrolyte capable of forming protective coatings, the mineral acid being selected from the group consisting of phosphoric acid and chromic acid, passing an electrical current through the exposed surfaces of the assembled laminations from one body of the solution to the other body at a density of from 0.1 ampere per square centimeter to 1.0 ampere per square centimeter of surface being treated with the mineral acid solution for a period of time to substantially remove the fine particles of metal by electrolytic action, removing the assembled laminations from the solution, with a film of the mineral acid adhering thereon to produce a non-corrosive insulating coating between laminations.

WELDON H. BRANDT.
MORGAN W. RIDER.
RAYMOND C. WESTPHAL.

REFERENCES CITED

The following references are of record in the file of this patent:

UNITED STATES PATENTS

| Number | Name | Date |
|---|---|---|
| 870,937 | Coslett | Nov. 12, 1907 |
| 1,658,222 | Burns | Feb. 7, 1928 |
| 1,867,527 | Dunn | July 12, 1932 |
| 1,949,713 | Gravell | Mar. 6, 1934 |
| 2,132,438 | Romig | Oct. 11, 1938 |
| 2,243,578 | Reardon | May 27, 1941 |
| 2,293,951 | Seastone et al. | Aug. 25, 1942 |

OTHER REFERENCES

"Hackh's Chemical Dictionary," 2nd edition, (1937), page 714.